Nov. 19, 1929.    C. SUTTER ET AL    1,736,058
LUBRICATING SYSTEM
Filed Dec. 11, 1926    4 Sheets-Sheet 1
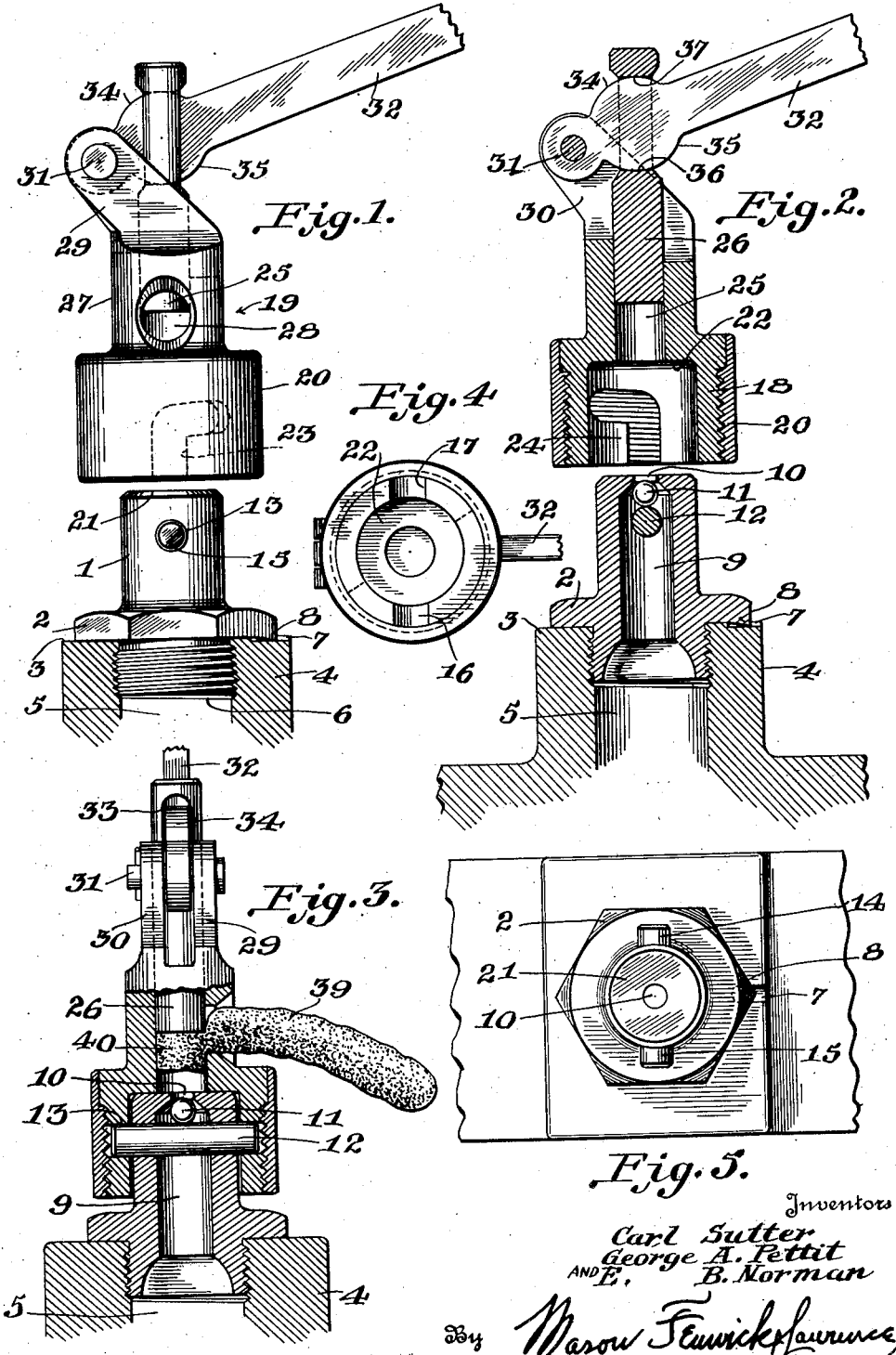

Nov. 19, 1929.  C. SUTTER ET AL  1,736,058
LUBRICATING SYSTEM
Filed Dec. 11, 1926  4 Sheets-Sheet 2
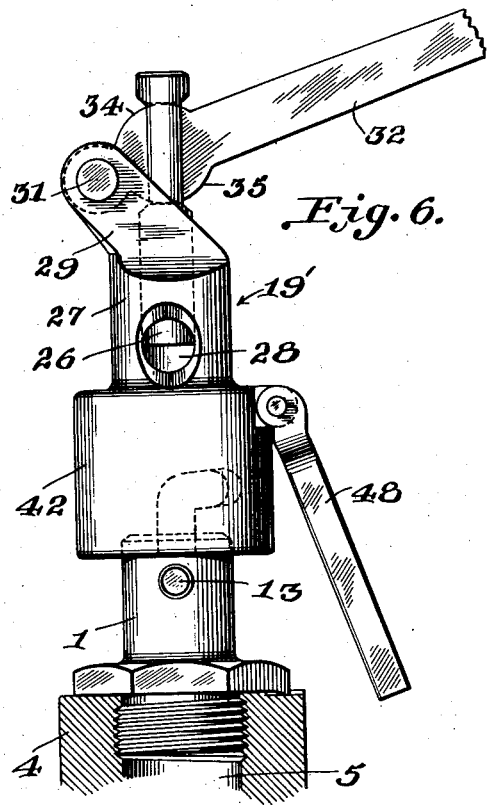
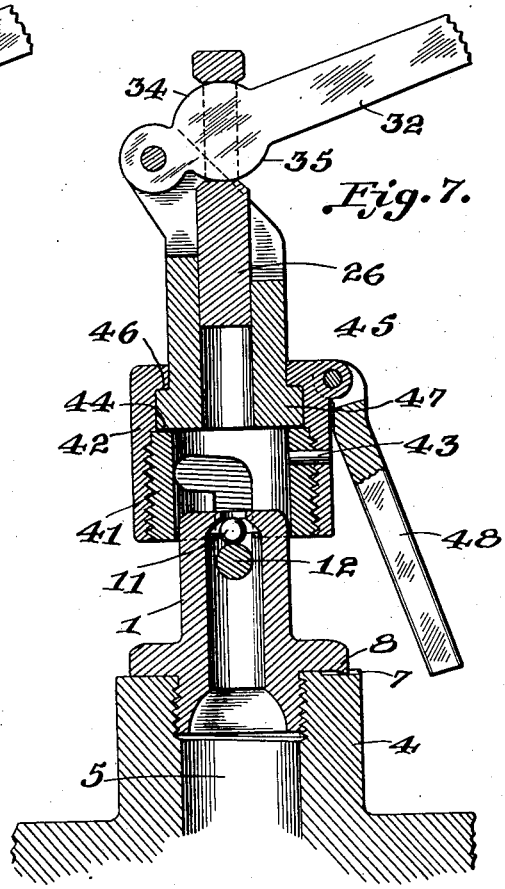
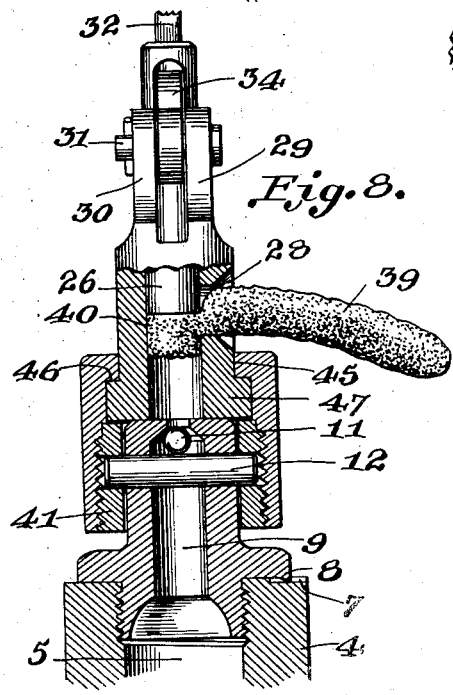
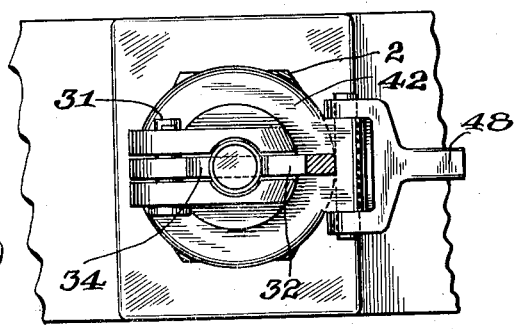
Inventors
Carl Sutter
George A. Pettit
AND E. B. Norman
By Mason Fenwick & Lawrence
Attorneys

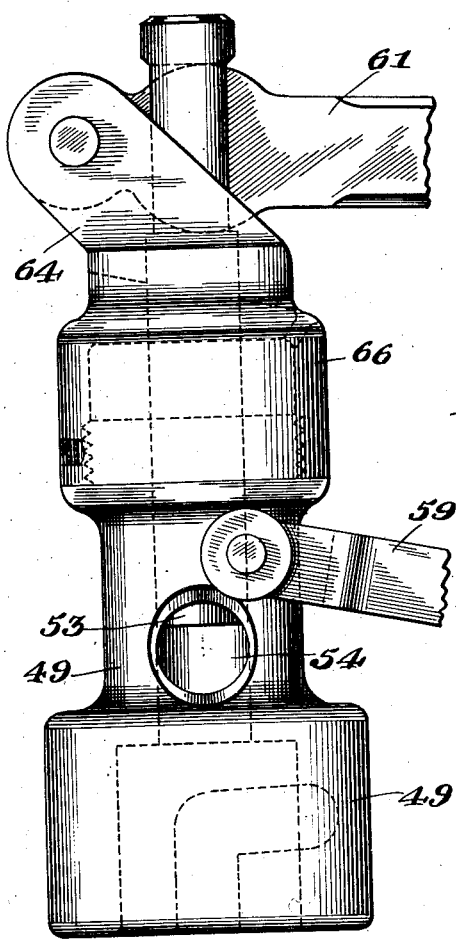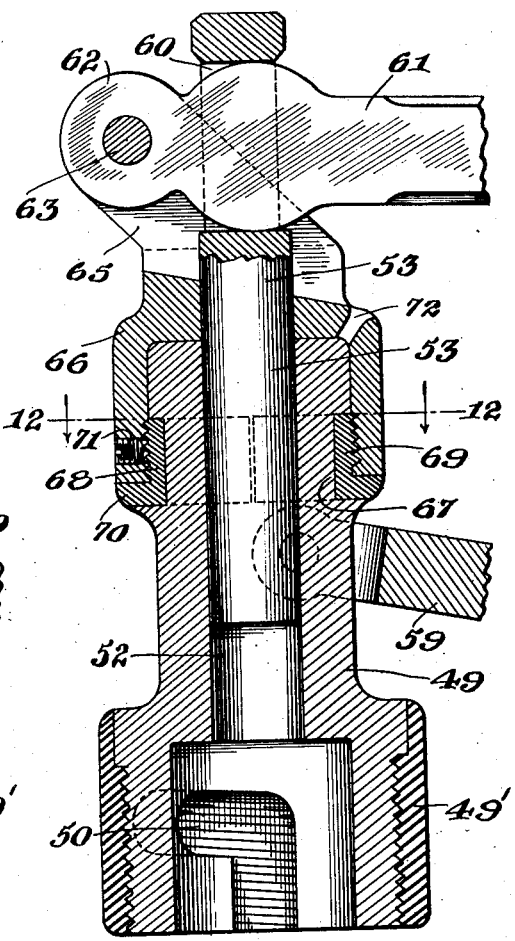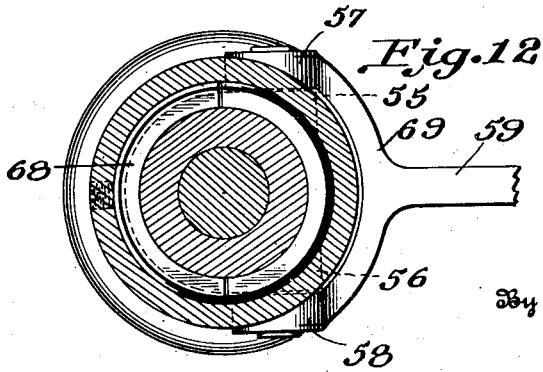

Patented Nov. 19, 1929

1,736,058

UNITED STATES PATENT OFFICE

CARL SUTTER, GEORGE A. PETTIT, AND ERNEST B. NORMAN, OF NEW ORLEANS, LOUISIANA, ASSIGNORS TO SAID GEORGE A. PETTIT

LUBRICATING SYSTEM

Application filed December 11, 1926. Serial No. 154,210.

The invention forming the subject matter of this application is a high pressure lubricating system peculiarly adapted for use on locomotives, and on other machines having moving parts subjected in ordinary use to great vibrations and centrifugal forces which tend to throw or shake off the plugs now in common use to hold lubricant in the bearings.

Heretofore, in lubricating railroad locomotives, it has been necessary to use screwthreaded plugs for the grease cups thereof, in order to obtain sufficient pressure on the hard lubricant required for use on locomotives to force this lubricant into the bearings, as it was not possible to use the ordinary spring controlled valved filler necks and grease guns commonly employed for lubricating the bearings of automobiles and similar mechanism which require only the use of relatively soft lubricant. On practically every run of a few hundred miles, it was common experience for locomotive engineers to find some of these old style grease cup plugs shaken out of their screwthreaded sockets, with the consequent loss of lubricant from the bearings, which frequently necessitated delays of the trains caused by the unlubricated pins becoming hot.

In addition to liability of these old style screwthreaded plugs becoming lost, their use involved considerable delay in filling the grease cups, and frequent rethreadings of the grease cups due to the stripping of their threads.

It is the main object of our invention to eliminate all the above named disadvantages of the old system, and to provide means whereby locomotives can be efficiently greased so quickly that "long run" engines can be thoroughly greased in a matter of five minutes while making ordinary station stops, which would not be possible with engines using the old style plugs and requiring at least thirty-two minutes for the greasing of a ten-bearing engine.

Another object of the invention is to avoid all loss of lubricant by providing the engine bearings with valve controlled plugs permanently fixed against withdrawal or rotation from the grease cups.

A further object is to provide such valve controlled plugs with means for forcing hard lubricant therethrough and into the grease cups.

Other objects of the invention will become apparent as the detailed description thereof proceeds.

In the drawings:—

Fig. 1 is an exploded elevation of our invention illustrating one of our filler plugs, permanently secured to a connecting rod bearing, with a device for forcing hard grease through the plug:

Fig. 2 is a central vertical section through the parts shown in Fig. 1.

Fig. 3 is an end view of several elements shown in Figs. 1 and 2 assembled in operative position, parts being sectioned and broken away to illustrate the operation of the invention;

Fig. 4 is a bottom plan view of the grease feeding element shown in Fig. 1; and

Fig. 5 is a plan view of the filler plug.

Fig. 6 is an elevation of a modification of the invention with the elements thereof partly separated;

Fig. 7 is a central vertical section of the elements shown in Fig. 6;

Fig. 8 is an end elevation of the invention shown in Figs. 6 and 7 with the elements thereof assembled in operative position, parts thereof being sectioned and broken away to illustrate the invention clearly.

Fig. 9 is a plan view of the elements illustrated in Fig. 6;

Fig. 10 is an elevation of another modification of this invention;

Fig. 11 is a central vertical section through said modification;

Fig. 12 is a horizontal section on the line 12—12 of Fig. 11;

Figure 13:
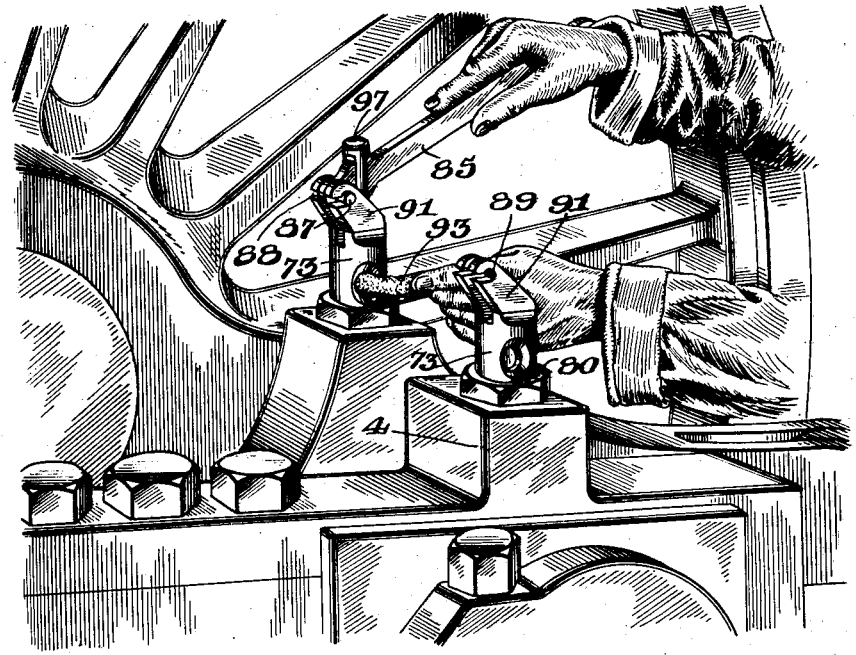
Fig. 13 is a perspective view illustrating a modification of the invention as applied permanently to the connecting rod and crank pin bearings of a locomotive.

The invention as illustrated in Figs. 1 to 5 inclusive, includes a cylindrical filler plug 1 having a flange 2 intermediate its ends adapted to seat on the face 3 of a connecting rod or crank pin bearing 4. The lubricant receiving bore 5 of bearing 4 is internally screwthreaded to receive the correspondingly screwthreaded part 6 of the plug 1, and the face 3 of bearing 4 is provided with a groove 7 adapted to receive the projection 8 formed by hammering down part of flange 2 into the groove 7, in order to lock the plug 1 permanently in position on its bearing 4.

The bore 9 of the plug 1 is narrowed at its upper end to form an aperture 10 controlled by the ball valve 11 which normally rests on the pin 12 extending transversely through the aperture 13 of plug 1. The pin 12 is longer than the diameter of plug 1 and has the ends 14 and 15 thereof projecting laterally from said plug, to interlock with inverted L-shaped slots 16 and 17 formed diametrically opposite each other in the cylindrical wall 18 of the lubricant-feeding member 19.

The slots 16 and 17 extend through the wall 18, and in order to reinforce the wall 18, thus weakened by the slots, the wall is externally screw-threaded to receive the corresponding internal screw-threads of a reinforcing ring 20. The grooves 16 and 17 cooperate with the projecting ends 14 and 15 of the pin 12 to form a bayonet joint adapted to connect the member detachably to plug 1.

The top face 21 of plug 1 is machined to fit the machined bottom face 22 of member 19, and the transverse parts of grooves 16 and 17 are slightly inclined so as to pull the faces 21 and 22 into close contact when the member 19 is fixed in operative position on the plug 1 as shown in Fig. 3. This machining of faces 21 and 22 and reinforcement of the wall 18 are absolutely necessary, because the terrific pressure of 4,500 pounds and up— necessary to force the hard grease through the plug 1 would cause leakage between faces 21 and 22 if they were not machine fitted and would tend to shear off the elements 23 and 24 of wall 18.

The member 19 is provided with a central cylindrical bore 25 in which a plunger 26 is mounted to reciprocate. An aperture 28 is laterally through the wall 27 of member 19 to communicate with bore 25. A pair of arms 29 and 30 extend upwardly and rearwardly from wall 27, and are spaced apart and apertured to receive the fulcrum pivot 31 of the plunger operating lever 32.

The lever 32 extends through a slot 33 formed in the upper end of plunger 26, which is provided with arcuate projections 34 and 35 in slidable contact with the ends 36, and 37 of slot 33 to slide over said end and reciprocate said plunger 26 in its bore 25 when the lever 32 is rotated on its fulcrum 31.

In operation of the apparatus so far described, the members 1 and 18 are interlocked as shown in Fig. 3, and the grease 39 which usually comes in rolls of a size to fit the aperture 28, is pushed endwise through aperture 28 until its end is stopped by the opposite wall of bore 25. Downward movement of plunger 26 cuts off a portion 40 of grease 39 and forces this portion past the ball 11 and pin 12, through the bore 9 of plug 1 and into the bore 5 of bearing 4. Repetition of this operation forces chopped off portions 40 of grease into the bearing until the bearing and plug becomes filled, and other portions 40 are forced into the filled plug and bearing until all the relatively rotating parts of the bearing are thoroughly lubricated. The feeder member 19 may then be removed.

In actual practice it has been found that, when the feeder 19 is removed from the filler neck, the back pressure of the highly compressed grease in the filled plug 1 forces the ball 11 into closing position on its seat aperture 10. Even after a prolonged run, when nearly all of the grease in the bearing has been used up, it is found that the ball 11 is still held in closing position. This is due to the fact that the grease, which is of the hardest consistency of driving journal compound, is so firmly packed between pin 12 and aperture 10 that it retains the ball 11 in closed position even when the grease at the bearing side of pin 12 has been used up.

As will be apparent from the drawings the ball 11 is held by pin 12 very close to aperture 10, and no springs are employed to keep ball 11 normally seated in aperture 10. Springs such as are commonly used for this purpose in the valves of filler necks of systems using soft grease, would be utterly superfluous and useless in a system using hard grease of the kind for which applicant's apparatus is designed. Because of the high pressure, such springs would be pressed flat by the compressed grease and would be an actual detriment instead of a help.

In the modification shown in Figs. 6, 7, 8 and 9, the plunger mechanism is swivelled relative to the bayonet joint parts in order to permit locking of this joint in cramped locations where it would be impossible to rotate the grease feeder bodily. The filler plug 1 is identical with that shown in Figs. 1 to 5. The only difference is that we have swivelled the plunger casing 27 in the bayonet joint connection to permit relative rotation between these two members.

The bayonet joint connection in this modification is formed by an externally screw-threaded cylindrical member 41 provided with inverted L-shaped slots similar in every respect to slots 16 and 17. A reinforcing ring 42 is internally screwthreaded to form a seat for member 41, and a pin 43 secures members 41 and 42 against relative rotation when member 41 is seated against shoulders 44 in ring 42 with its lower end flush with ring 42. The ring 42 is provided with an aperture 45 located so as to form a shoulder 46. The member 19' has a flange 47 at its lower end to seat rotatably in ring 42 between the upper end of member 41 and shoulder 46. A lever 48 pivoted to ring 42 serves to rotate the ring 42, and the slotted member 41 pinned thereto, independently of the plunger member 19' whenever it becomes necessary to do so. All the other elements of this modification are identical with the corresponding elements disclosed in Figs. 1 to 5 inclusive, and are therefore similarly numbered.

The operation of the modification just described and the functions of its several parts will be obvious from inspection of Figs. 7 and 8 of the drawing.

A further modified form of the invention is disclosed in Figs. 10, 11 and 12 of the drawing. This is also of the swivelled feeder type. A filler neck of the same construction as shown in Figs. 1 to 9 inclusive is adapted to be used with this feeder, and need not be further illustrated here.

The bayonet joint member 49 has the inverted L-shaped slots 50 cut therethrough and is provided with a reinforcing ring 49' similar to ring 20. The member 49 is centrally bored to form a plunger cylinder 52 in which the plunger 53 is mounted to reciprocate and a grease feeding aperture 54 is bored horizontally through member 49 to meet the cylinder 52.

Bosses 55 and 56 are cast on opposite sides of the member 49 to form seats for the ends 57 and 58 of a yoke lever 59 which has said ends similarly pivoted to said bosses. This lever obviously, is intended to be used to rotate member 49 into or out of locking relation with a filler plug 1.

The plunger 53 is provided with a slot 60 through which the lever 61 passes to be pivoted at its end 62 on pivot pin 63 supported by standards 64 and 65 extending upwardly from the swivel cap 66.

The member 49 is turned near its upper end to form a recess 67 in which the semi-circular halves 68 and 69 of a split ring are rotatably mounted. This ring has a flange 70 projecting laterally from the bottom end thereof and is externally screwthreaded to receive the corresponding internal screwthreads of the cap member 66. When the cap 66 is screwed down hard on flange 70, a set-screw 71 locks the cap and split ring together. An oil duct 72 serves to lubricate the joint between the cap 66 and the member 49.

It will be obvious from Figs. 10 and 11 that members 49 may be rotated independently of the plunger 53 and lever 61, to lock said member to a filler plug 1 in cramped locations where it would be impossible to rotate lever 61 with member 49.

So far we have described our invention as limited to systems in which the grease feeder is detachable from the filler plug. Our invention broadly is not to be considered as so limited, as it extends to systems in which the plug is permanently fixed to a bearing and includes a means for feeding heavy grease thereto as a part thereof.

Attention is directed to the fact that the grease cutting and feeding mechanism employed in this system is not what is commonly known as a "grease gun"; it is not a container, it is a chopping or cutting and feeding device adapted to cut off pieces of hard grease from a roll thereof and to feed these cut off pieces into a bearing under great pressure.

Figure 14:
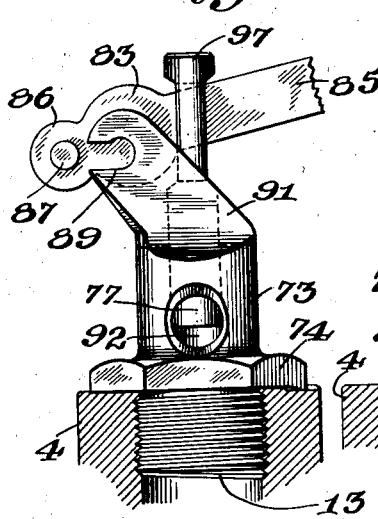
Fig. 14 is an elevation of the modification shown in Fig. 13 with the lubricant feeding mechanism assembled on the valved grease plug.
Figure 15:
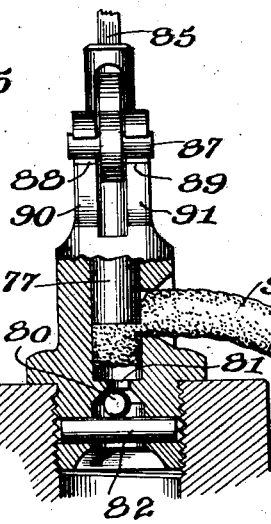
Fig. 15 is an end elevation of the elements shown in Fig. 14, assembled in operative position; parts being broken away and sectioned to show the operation of this form of the invention; and, Fig. 16 is a central vertical section of the elements shown in Fig. 14, but with the parts shown assembled in operative relation.
Figure 16:
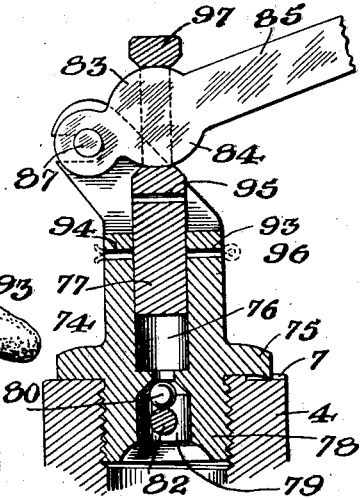

In the modification shown in Figs. 13 to 16 inclusive, the filler plug and cutting and feeding mechanism is combined. The bore 5 of bearing 4 is internally screw-threaded to receive the corresponding external screw-threads of the cylindrical plug 73. A polygonal flange 74 intermediate the ends of plug 73 serves as a seat for the plug when the latter is screwed down hard on the bearing 4, and is adapted to have one corner 75 thereof hammered down into the groove 7 to lock the plug securely in the bearing 4.

The plug 73 is centrally bored to form a lubricant cutting and feed cylinder 76 in which the plunger 77 is adapted to reciprocate. The screw threaded end 78 has also a central bore 79 housing a ball 80 adapted, by back pressure of the lubricant in bearing 4, to close the aperture 81 which serves to connect the bore 79 with cylinder 76. A pin 82 extending across bore 79 supports ball 80, when not under back pressure, slightly spaced from aperture 81.

The plunger 77 is slotted at its upper end to fit the arcuate projection 83 and 84 of the lever 85, which has one end 86 thereof provided with a pivot pin 87 extending laterally therethrough to seat detachably in the pivot slots 88 and 89 formed in the ends of standards 90 and 91 respectively, rising from the upper end of plug 73. An aperture 92 is adapted to receive the lubricant roll 93 to cut it off and feed it to the bearing 4 by reciprocation of arm 85 in the usual manner.

The plunger 77 may either be detached along with lever 85 from the plug 73; or the lever 85 may be removed alone, leaving the plunger 77 in cylinder 76 to serve as a dust plug. In order to lock the plunger 77 in cylinder 76, the plug 73 is provided with alined apertures 93 and 94, and the plunger 77 is provided with an aperture 95 adapted to aline with apertures 93 and 94 when plunger 77 is in its lowest position in cylinder 76. When apertures 93, 94 and 95 are so alined, a cotter pin 96 may be inserted to lock plunger 77 to plug 73.

This last form of the invention is also peculiarly adapted for use in locations where it may not be possible to use even the lever 85, in which case, a hammer, weight, or other source of pressure may be used directly on the end 97 of plunger 77 to cut off and force grease into the bearing 4.

It is to be understood that the filler plugs of this system may be permanently secured to their bearings by riveting or welding or in any other suitable manner; but because of the high pressure to which they are subjected, and the centrifugal and vibratory forces acting thereon, it is desirable and practically essential that they be permanently fixed to their bearings to avoid their being shaken therefrom as is frequently the case with the ordinary screw plugs now commonly used on locomotive engines.

The words "permanently fixed" wherever used in the following claims means "rigidly, non-rotatably, and non-slidably fixed", just as if the plug to which it refers were cast integral with the bearing to which it is so fixed, and the claims are intended to be broad enough to cover devices where such filler plugs are cast integral with the bearing.

We claim:—

1. A valve controlled plug, a cylinder extending from said plug and having an aperture through the side thereof, a piston reciprocable in said cylinder to sever hard lubricant from a bar extending through said aperture into said cylinder and to force the severed lubricant through said plug into said bearing, said piston having a slot therethrough and a lever fulcrumed at the side of said cylinder and passing through said slot to engage the ends thereof to reciprocate said piston in said cylinder.

2. A lubricating device comprising a cylinder, a piston reciprocable in said cylinder and having a slot in one end thereof, a lever passing through said slot and fulcrumed at the side of said cylinder and having opposed cam edges engaging the ends of said slot to reciprocate the piston in said cylinder.

3. A lubricating device comprising a cylinder having an outlet at one end thereof, provided with means for detachably connecting it to a filler neck and having an opening through the sides thereof, a piston reciprocable in said cylinder past said opening and having a part projecting from said cylinder provided with an axial slot, and a lever fulcrumed at the side of said cylinder and having opposite edges thereof engaging the ends of said slot to reciprocate said piston.

4. A lubricating device comprising a cylinder having bayonet joint slots at one end thereof and externally screwthreaded, a sleeve screwthreaded onto said end and covering said slots, a piston reciprocable in said cylinder and means connected to said cylinder to reciprocate said piston.

5. A cylinder having inverted L-shaped slots extending laterally through the wall thereof at one of its ends, a sleeve fixed to said cylinder on the outside thereof to cover said slots, a piston slidable in said cylinder and a lever fulcrumed on said cylinder and engaging said piston to reciprocate it.

In testimony whereof we affix our signatures.

CARL SUTTER.
GEORGE A. PETTIT.
ERNEST B. NORMAN.